United States Patent
Beste et al.

(10) Patent No.: US 10,333,780 B2
(45) Date of Patent: Jun. 25, 2019

(54) METHOD, APPARATUS AND COMPUTER PROGRAM PRODUCT FOR UPDATING LOAD BALANCER CONFIGURATION DATA

(75) Inventors: Fredrick Beste, Uppsala (SE); Anders Franzen, Trangsund (SE); Tarik Hammam, Kista (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 452 days.

(21) Appl. No.: 14/008,154

(22) PCT Filed: Mar. 28, 2011

(86) PCT No.: PCT/IB2011/051308
§ 371 (c)(1),
(2), (4) Date: Sep. 27, 2013

(87) PCT Pub. No.: WO2012/131428
PCT Pub. Date: Oct. 4, 2012

(65) Prior Publication Data
US 2014/0019607 A1    Jan. 16, 2014

(51) Int. Cl.
*H04L 12/24* (2006.01)
*H04L 12/803* (2013.01)

(52) U.S. Cl.
CPC ........ *H04L 41/0816* (2013.01); *H04L 47/125* (2013.01)

(58) Field of Classification Search
CPC .................... H04L 41/0816; H04L 47/125
See application file for complete search history.

(56) References Cited

U.S. PATENT DOCUMENTS

| | | | |
|---|---|---|---|
| 2002/0124089 A1* | 9/2002 | Aiken, Jr. | H04L 29/06 709/227 |
| 2005/0044227 A1* | 2/2005 | Haugh et al. | H04L 29/06 |
| 2005/0114507 A1* | 5/2005 | Tarui et al. | H04L 29/12264 |
| 2005/0220124 A1* | 10/2005 | Oguchi et al. | H04L 47/10 |
| 2006/0187928 A1 | 8/2006 | McGee et al. | |
| 2010/0302940 A1 | 12/2010 | Patel et al. | |

OTHER PUBLICATIONS

EP office action in application No. 11722525.0 dated Aug. 11, 2017.
EP office action in application No. 11722525.0 dated Jan. 11, 2017.
Office Action in Application No. 11722525.0 dated Apr. 25, 2018.

* cited by examiner

*Primary Examiner* — Chris Parry
*Assistant Examiner* — Soe M Hlaing
(74) *Attorney, Agent, or Firm* — Patent Portfolio Builders, PLLC

(57) ABSTRACT

A load balancing system that utilizes a dynamic method for updating a load balancer's pool of targets (e.g., a dynamic method for adding newly available targets to the pool of targets and/or removing from the pool of targets a target that is no longer accepting new connections). Advantageously, this dynamic method does not require periodic monitoring of each of the targets in the pool of targets.

20 Claims, 11 Drawing Sheets

| port number | # of users | outgoing | exclusive |
|---|---|---|---|
| 20 | 1 | true | false |
| 80 | 5 | false | false |
| 100 | 1 | false | true |

FIG. 10

METHOD, APPARATUS AND COMPUTER PROGRAM PRODUCT FOR UPDATING LOAD BALANCER CONFIGURATION DATA

CROSS-REFERENCE TO RELATED APPLICATION

This application is a 35 U.S.C. § 371 National Phase Application from PCT/IB2011/051308, filed Mar. 28, 2011, and designating the United States.

TECHNICAL FIELD

The invention relates to methods for updating configuration data used by a load balancer.

BACKGROUND

Load balancing is used widely in the data processing industry and several load balancing products are commercially available. A load balancer, which is sometimes referred to as a Server Load Balancer (SLB), is used typically in computer cluster environments. A load balancer functions to distribute traffic (e.g., Transmission Control Protocol (TCP) connections) according to a distribution policy (e.g. round robin) among a defined set of targets. Such a set of targets may be referred to as a "pool of targets."

For example, when the traffic to be distributed consists of certain TCP connections, the pool of targets may consist of a set of processing units that each run a service (e.g., an HTTP server or FTP server), where each service is listening for incoming TCP connections on a certain port (e.g., port 80). In such a scenario, when the load balancer receives from a client a TCP connection request (i.e., TCP SYN packet), which connection request signals the start of a new TCP connection, the load balancer will select from the pool of targets a particular target to handle the new TCP connection. All packets received by the load balancer belonging to that TCP connection will be provided to the target that was selected to handle the connection. Thus, the load balancer may act as a gateway between clients, on the one hand, and the pool of targets, on the other hand.

Load balancers are typically configured through a command-line interface, a graphical user interface, or a configuration protocol (e.g., a protocol based on the Network Configuration Protocol (NETCONF)). Adding a target to a pool of targets requires reconfiguration of the load balancer (e.g., it may requires updating a table that identifies each target in the pool of targets). This load balancer reconfiguration would typically be done by an operator manually through a command-line interface. Similarly, removing a target from a pool of targets would also require reconfiguration of the load balancer.

Existing Internet Protocol (IP) load balancers may be configured to monitor a pool of targets so that a target can be removed from the pool if the target is taken out of service. A common form of monitoring consists of periodically sending an echo request (e.g., an ICMP echo request) to each target in the pool of targets. This is commonly referred to as "pinging" the pool of targets. While pinging a target is easy to implement, it is not an accurate way to determine whether a target has been taken out of service. Additionally, existing IP load balancers typically use Network Address Translation (NAT) and/or Direct Server Return (DSR). It is well known to a person familiar with the art that DSR can only be used for load balancing inbound TCP traffic and that there are a multitude of undesirable side-effects when NAT is used, which side effects significantly limit the usefulness of NAT in some environments.

What is desired, therefore, are systems and methods for providing an improved load balancing system.

SUMMARY

As discussed above, a load balancer needs to maintain an up-to-date pool of targets. That is, when a new target becomes available, the load balancer needs to add the new target to the pool of targets. Similarly, when an existing target that is included in the pool of targets is taken off line, the load balancer needs to remove the target from the pool of targets. Described herein is, among other things, a load balancing system that utilizes a dynamic method for updating a load balancer's pool of targets (e.g., a dynamic method for adding newly available targets to the pool and/or removing from the pool targets that are no longer accepting new connections). Advantageously, this dynamic method does not require periodic monitoring of each of the targets in the pool of targets. Additionally, in some embodiments, the load balancing system does not utilize NAT and/or DSR.

In one particular aspect, a method for updating configuration data used by a load balancer to balance traffic among the targets included in a pool of targets is provided. In some embodiments, the method is performed by a network resource controller (NRC) and begins with the NRC receiving, from a first target, a resource request message requesting use of a network resource (e.g., a port number, such as a TCP port number). This resource request includes information identifying the network resource. In response to receiving the resource request message, the NRC updates the configuration data, which comprises information identifying the targets that are included in the pool of targets. The step of updating the configuration data comprises modifying the configuration data such that the first target is included in the pool of targets. In some embodiments, prior to updating the configuration data, the NRC determines whether the network resource is available to be used by the first target and updates the configuration in direct response to determining that the port number is available to be used by the first target.

In some embodiments, the resource request message indicates that a service executing on the first target is configured to listen on a socket to which the port number is bound. For example, in some embodiments, the resource request message indicates that the service executing on the first target has called a socket listen function provided by a socket application programming interface (API) and has passed to the listen function an identifier identifying a socket to which the TCP port number is bound.

In some embodiments, the NRC transmits to the first target a response message indicating that the port number is available to be used by the first target, wherein the NRC transmit the response message in direct response to determining that the port number is available to be used by the target.

In some embodiments, the NRC receives, from a second target, a TCP connect-request message indicating that the second target is configured to initiate a TCP connection, and, in response to receiving the TCP connect-request message, the NRC selects an available port number for use with the TCP connection. After selecting the available port number, the NRC transmits to the second target a response message containing the selected port number. The NRC may also set an outgoing connection flag associated with the selected TCP port number to a predetermined value (e.g., TRUE) as a result of selecting the port number.

In some embodiments, the NRC receives, from a second target, a bind-request message indicating that the second target is configured bind an address to a UDP socket, and, in response to receiving the bind-request message, the NRC updates the configuration data, which comprises information defining a second pool of targets. The NRC updates the configuration data by modifying the information defining the second pool of targets such that the second target is included in the second pool of targets. After receiving the bind-request message, the NRC may receive from the second target a connect-request message indicating that the second target is configured associate a remote address with the UDP socket. In response to receiving the connect-request message, the NRC modifies the information defining the second pool of targets such that the second target is no longer included in the second pool of targets.

In some embodiments, the NRC updates the configuration data by transmitting to the load balancer a configuration message that includes: (i) a first identifier identifying the network resource and (ii) a second identifier uniquely associated with the first target. In these embodiments, the load balancer is configured to modify the configuration data in response to receiving the configuration message.

In some embodiments, the NRC receives from a second target a second resource request message requesting use of the same network resource. in response to receiving the second resource request message, the NRC modifies the configuration data such that the second target is included in the pool of targets. In some embodiments, the network resource comprises a port number and an IP address, and the step of modifying the configuration data such that the second target is included in the pool of targets is performed during a period of time where the first target is using the network resource.

In some embodiments, the NRC receives from the first target a close message indicating that the first target no longer requires the network resource. In response to receiving the close message, NRC modifies the configuration data such that the first target is not included in the pool of targets.

In another particular aspect, a network resource controller for updating configuration data used by a load balancer to balance traffic among the targets included in a pool of targets is provided. In some embodiments, the network resource controller includes: (a) a network interface that is operable to receive, from a target, a resource request message including information identifying a network resource, and (b) a data processing system coupled to the network interface. In some embodiments, the data processing system is configured to: (i) determine whether the network resource identified in the resource request message is available to be used by the target in response to the network interface receiving the resource request message and (ii) in response to determining that the network resource is available to be used by the target, modify the configuration data used by the load balancer so that the configuration data includes information indicating that the pool of targets includes the target that transmitted the resource request message.

In some embodiments, the data processing system is further operable to, in response to processing a resource request message that was transmitted by a target and received by the network interface and that includes a port number, determine whether the port number included in the resource request message is available to be used by the target. The data processing system may further be configured such that, in response to determining that the port number is available to be used by the target, the data processing system modifies the configuration data so that the configuration data includes information indicating that the target that transmitted the resource request message is included in the pool of targets. In some embodiments, the data processing is configured to determine whether the port number is available by determining whether an exclusive use flag associated with the port number is set to a certain value and/or determining whether an outgoing connection flag associated with the port number is set to a certain value.

In some embodiments, the data processing system is further configured such that the data processing system uses the network interface to transmit to the target a response message indicating that the port number is available to be used by the target. The transmission of the response message by the data processing system may occur in direct response to the data processing system determining that the port number is available to be used by the target.

In some embodiments, the data processing system is further configured such that the data processing, in response to processing a close message transmitted from a target indicating that the target no longer requires the network resource, modifies the configuration data such that the pool of targets no longer includes the target. The data processing system may be configured to modify the configuration data by sending a configuration message to the load balancer, which may be configured to modify the configuration data in direct response to receiving the configuration message.

In another particular aspect, a computer program product for updating configuration data used by a load balancer to balance traffic among the targets included in a pool of targets is provided. In some embodiments, the computer program product includes a computer readable medium storing computer readable program code. The computer readable program code includes: (1) a set of instructions for receiving a resource request message transmitted from a target, the resource request message requesting use of a network resource; (2) a set of instructions for determining whether the requested network resource is available to be used by the target; and (3) a set of instructions for sending to the load balancer a configuration message in response to a determination that the network resource is available, the configuration message being configured to cause the load balancer to add an identifier associated with the target to a target list that defines the pool of targets, thereby including the target in the pool of targets.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 10 illustrates an example port table.

DETAILED DESCRIPTION

Figure 1:
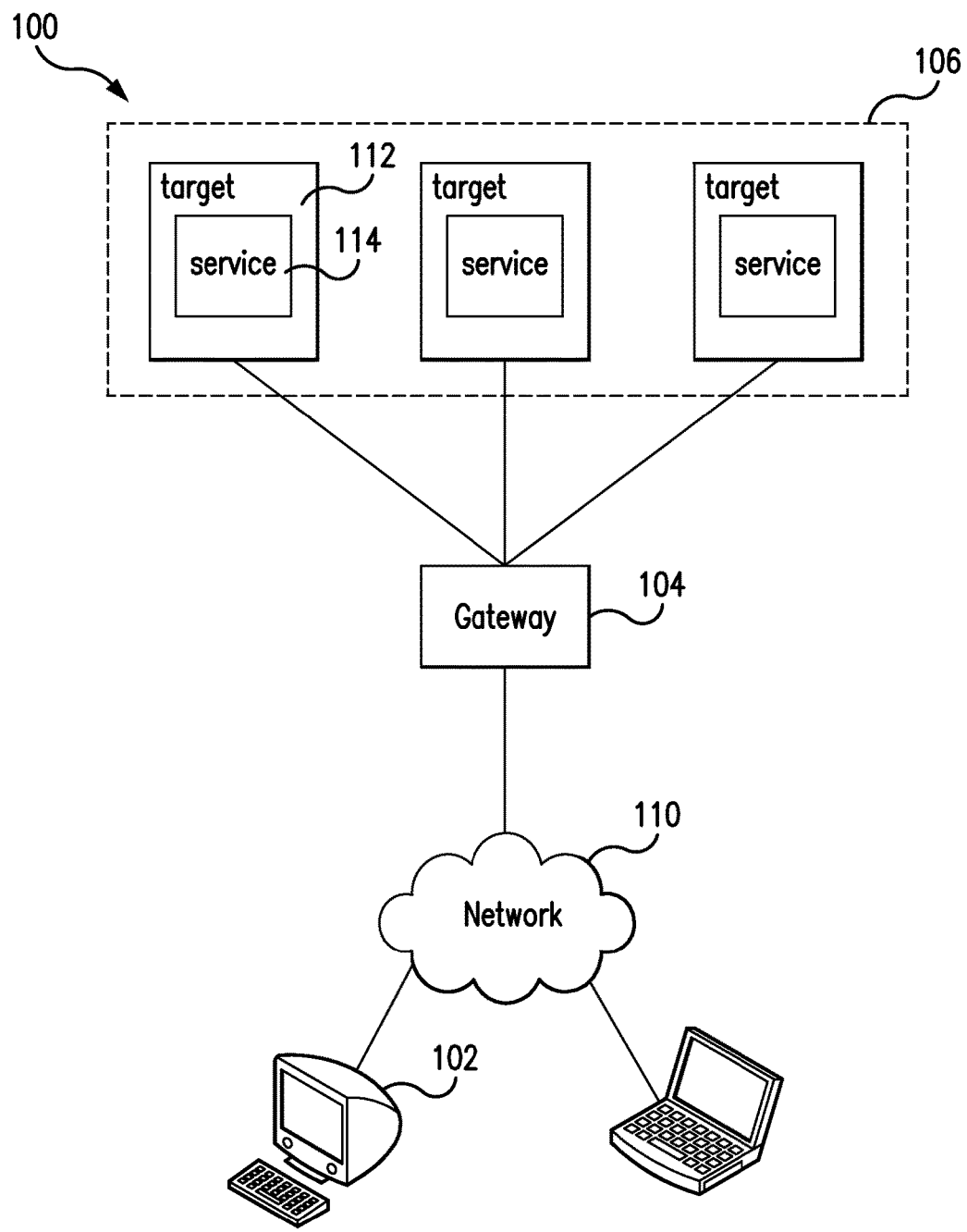
FIG. 1 illustrates a particular embodiment of a load balancing system.

Referring now to FIG. 1, FIG. 1 illustrates an improved load balancing system 100. Load balancing system 100 includes a gateway 104 that performs, among other things, a load balancing function. That is, gateway 104 balances traffic among the plurality of targets that are included in a pool of targets. In the example shown, there exists a single pool of targets 106 that includes three targets 112. As further shown, a service 114 executes on each of the targets 112. A target 112 may be a general purpose computer or other data processing device. In some embodiments, a target 112 may be a blade server. A service 114 can by any application, such as a Hypertext Transfer Protocol (HTTP) server or File Transfer Protocol (FTP) server.

In some embodiments, gateway 104 balances IP traffic (e.g., TCP/IP or UDP/IP) traffic among the targets 112. In some particular embodiments, gateway 104 balances TCP connections among the targets 112. In this particular embodiment, when a client (e.g., client 102) transmits a TCP connection request that is routed by network 110 to gateway 104, gateway 104 will select from the pool of targets 106 one of the targets 112 to handle the TCP connection initiated by the connection request and may forward to the selected target 112 the TCP connection request. The selected target 112 should then respond to the TCP connection request by transmitting to the client 102 an acknowledgment. In this known manner, a TCP connection is established. After the TCP connection is established, the selected target 112 and the client 102 can transmit payload packets to each other using the TCP connection.

In some embodiments, not only does the inbound traffic from network 110 flow though gateway 104 before it reaches a target 112, but also the outbound traffic (i.e., the traffic originating from a target 112) flows through gateway on its way to network 110. Thus, in some embodiments, load balancing system does not use DSR.

In the above described TCP connection scenario, whenever gateway 104 receives from client 102 an IP packet belonging to the established TCP connection, gateway 104 will forward the IP packet to the target that was selected to handle the TCP connection. Thus, gateway 104 maintains configuration data (e.g., a target list) that identifies each of the targets 112 that are included in the pool of targets 106 and configuration data (e.g., a connection table) that maps TCP connections (or UDP sessions) to selected targets.

Figure 2:
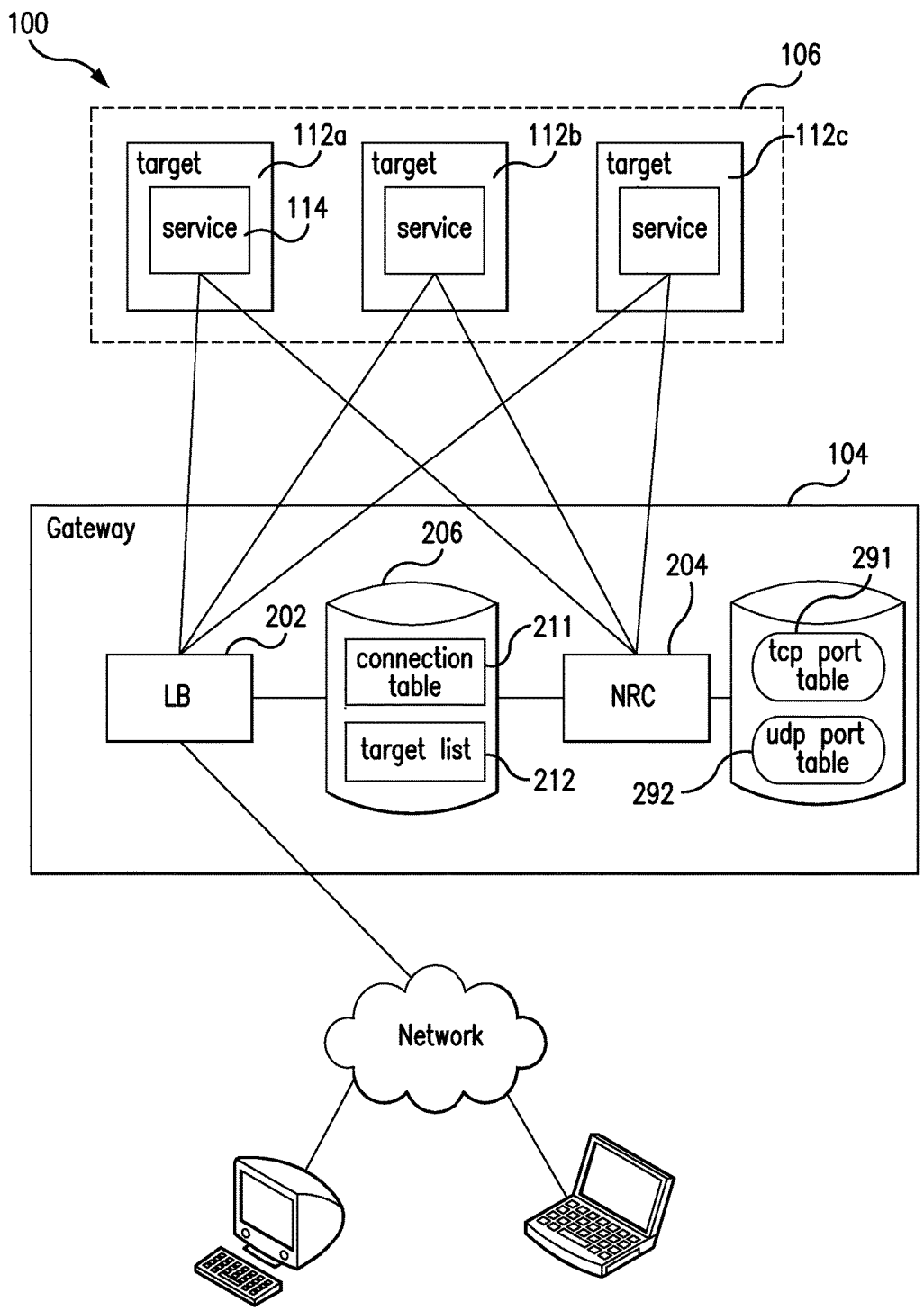
FIG. 2 is a functional diagram of a particular embodiment of a gateway.

Referring now to FIG. 2, FIG. 2 provides an illustration of one possible embodiment of gateway 104. As shown in FIG. 2, gateway 102 may include a load balancer 202 and a network resource controller (NRC) 204. Load balancer 202 and NRC 204 may be or include software modules and the software modules may execute on the same computer or on separate computers. Thus, gateway 104 may comprise one or more computers.

As illustrated in FIG. 2, gateway 104 includes a set of configuration data 206 that includes a connection table 211 and a target list 212. As discussed above, the target list 212 defines a pool of targets among which load balancer 202 balances certain traffic. For example, each target 112 may be associated with a unique target identifier (e.g., a MAC address or other identifier) and target list 212 may comprise a set of target identifiers. In such a scenario, each target 112 that is associated with a target identifier that is included in target list 212 is considered to be included in the pool of targets and load balancer 202 functions to balance certain traffic (e.g., TCP connections directed to a certain TCP port) among these targets 112.

While only a single target list 212 is shown in FIG. 2, it is possible for there to exist multiple target lists, where each target list is associated with a different network resource (e.g., layer 4 port number and protocol). For example, if targets 112a-c each ran an HTTP service (TCP port 80) and if targets 112b-c also ran an FTP service (TCP port 20), then there may exist two target lists: one associate with port 80 (the HTTP service) and the other associated with port 20 (the FTP service). In some embodiments, target list 212 may also include information identifying a certain load balancing distribution policy (e.g., round-robin).

Figure 3A:
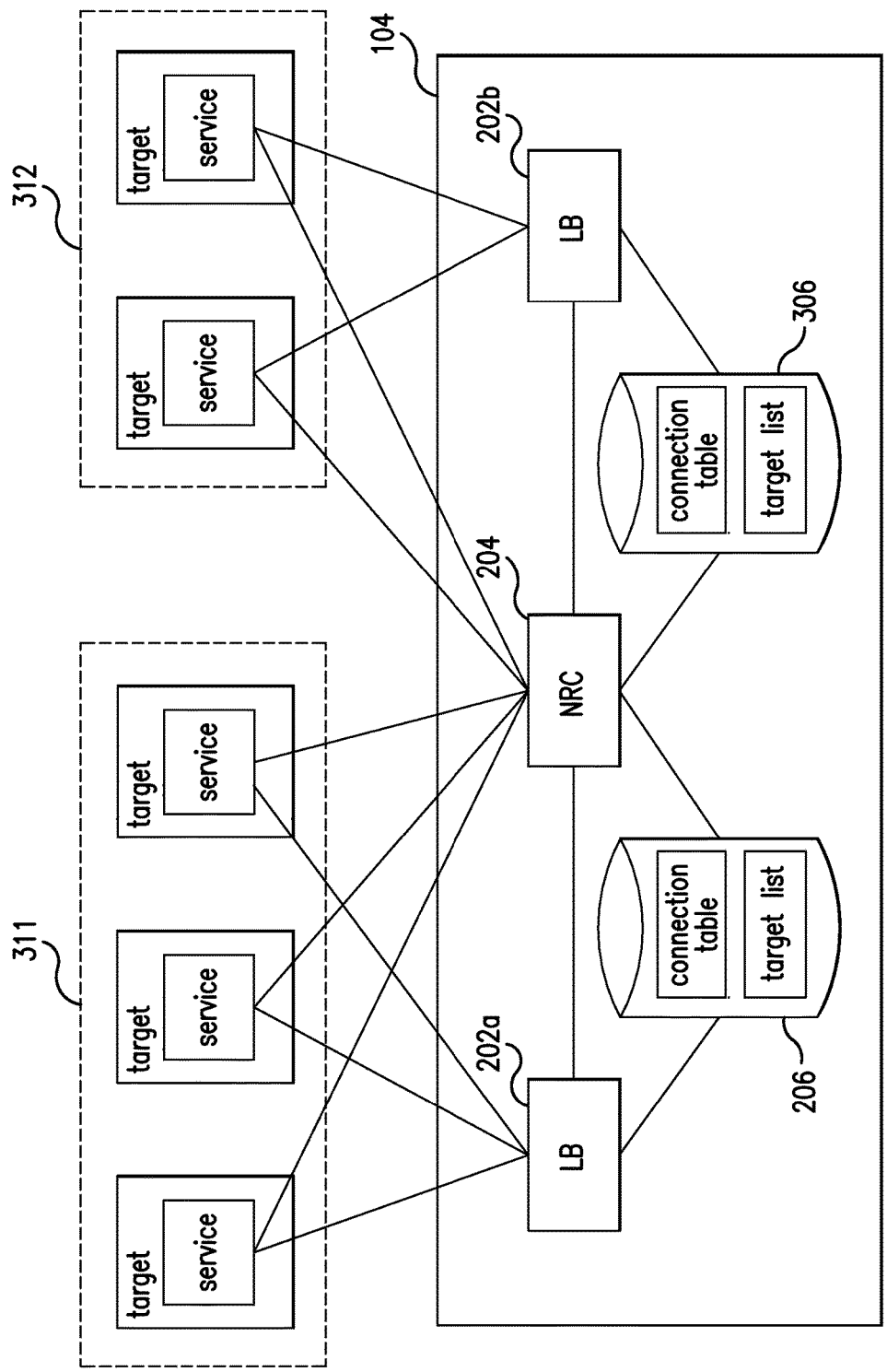
FIGS. 3A and 3B are functional diagrams of other particular embodiments of the gateway.
Figure 3B:
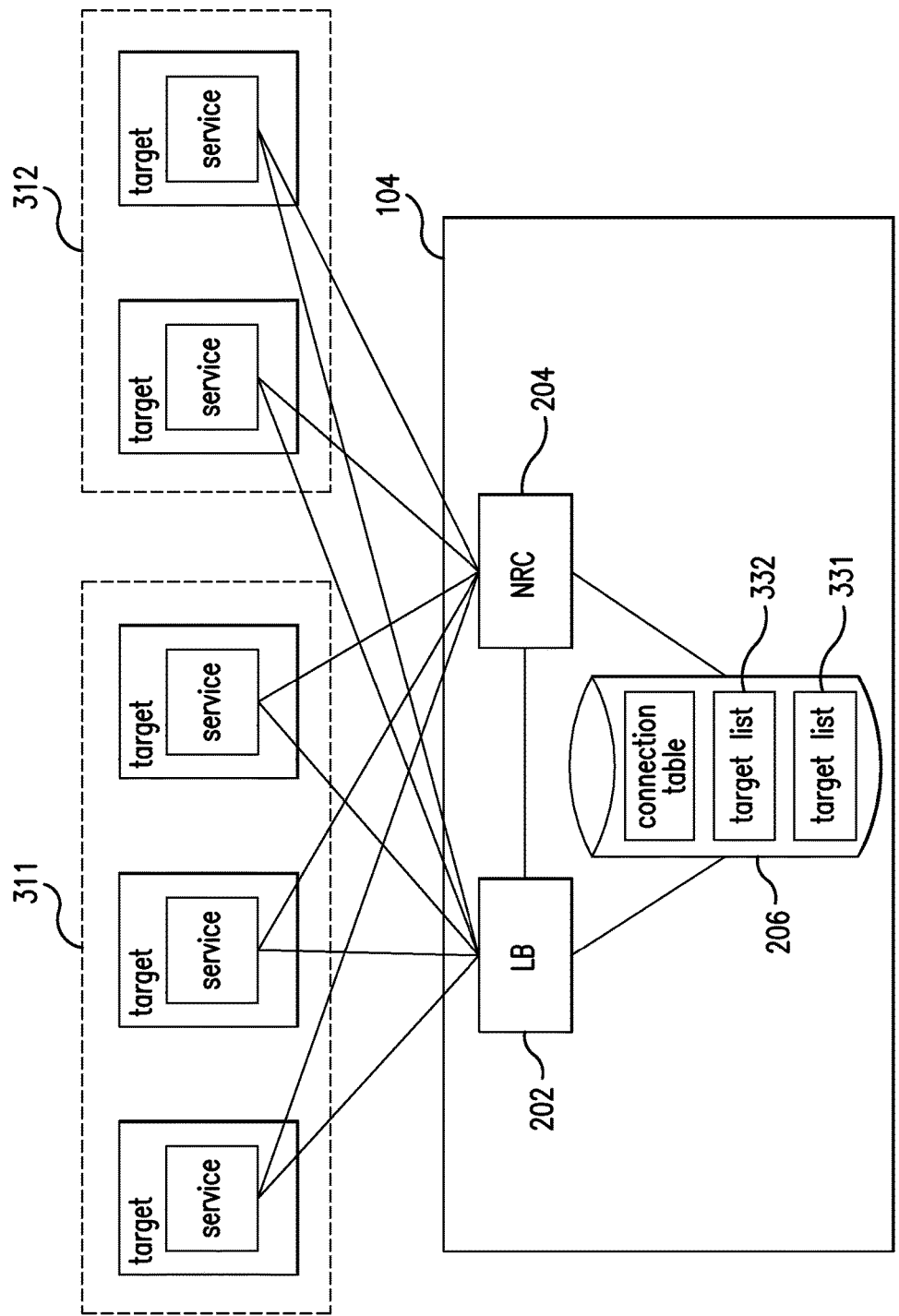

Referring now to FIGS. 3A and 3B, each of these figures provides an illustration of another possible embodiment of gateway 104. As shown in FIG. 3A, gateway 104 may include two load balancers: load balancer 202a and load balancer 202b, and for each load balancer a set of configuration data that is used by the load balancer to balance and forward traffic. For example, load balancer 202a uses configuration data 206 to balance traffic among the targets 112 included in cluster 311 and load balancer 202b uses configuration data 306 to balance traffic among the targets 112 included in cluster 312. As shown in FIG. 3B, configuration data 206 may include two target lists: target list 331 and target list 332. Load balancer 202 may use target list 331 to balance traffic among the targets 112 included in cluster 311 and may use target list 332 to balance traffic among the targets 112 included in cluster 312.

Advantageously, in each of the embodiments shown, NRC 204 can be configured to (1) detect that a target should be added to a certain pool of targets and (2) in response to detecting that a new target should be added to a certain pool of targets, automatically add the new target to the pool of targets. Additionally, NRC 204 may be configured to control use of certain network resources by targets 112.

Figure 4:
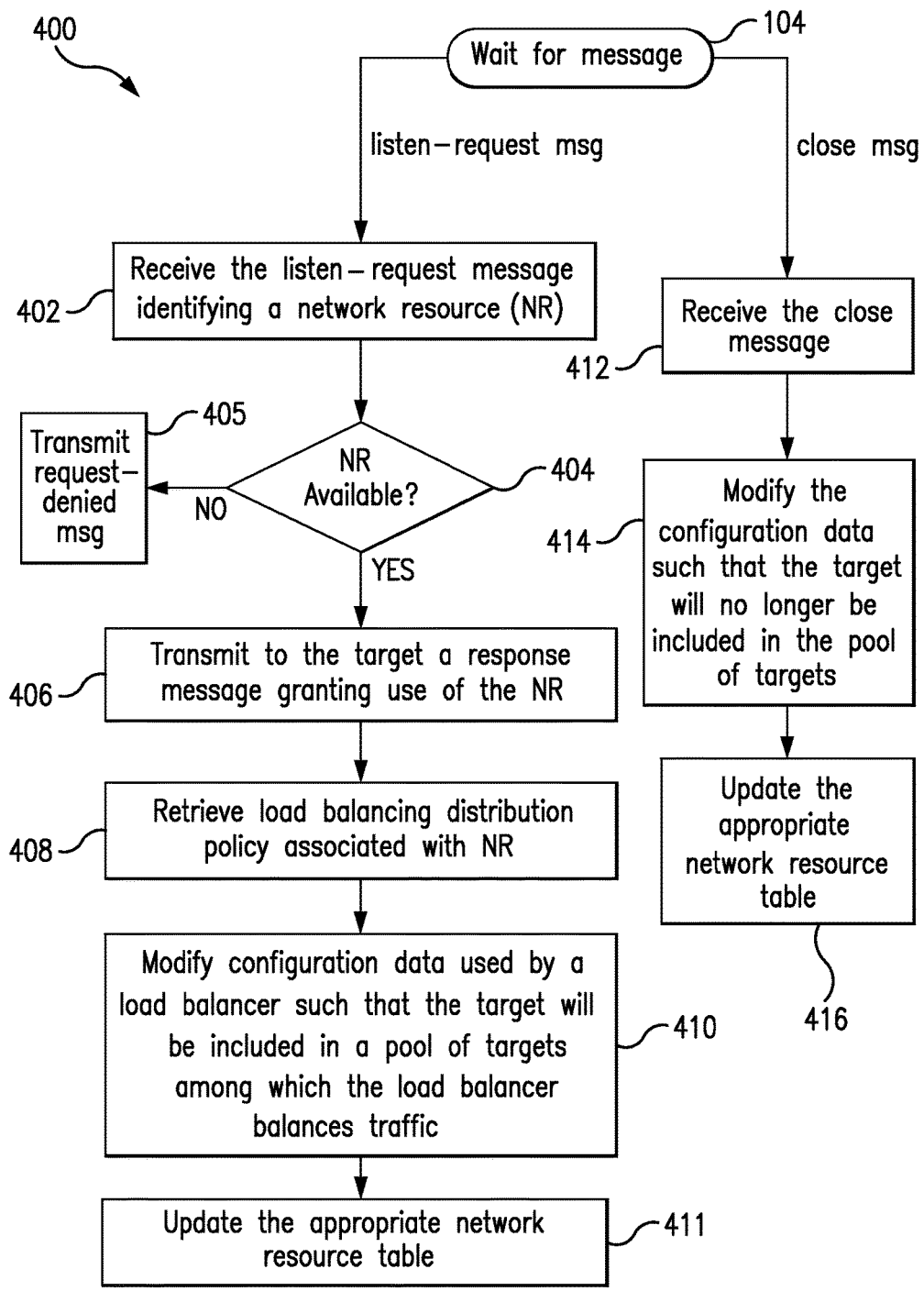
FIGS. 4-7 are flow charts illustrating various processes according to particular embodiments.

Referring now to FIG. 4, FIG. 4 is a flow chart illustrating a process 400 that may be preformed by NRC 204. Process 400 may begin in step 401 where NRC 204 waits to receive a message from a target. If a target 112 transmits a resource request message (such as a "listen-request" message—i.e., a message indicating that a service 114 running on the target 112 is configured to use a particular network resource for accepting incoming connection), then process 400 proceeds to step 402. If a target 112 transmits a "close" message (i.e., a message indicating that a service 114 running on the target 112 is no longer using a particular network resource), then process 400 proceeds to step 412.

In step 402, NRC 204 receives from the target 112 the listen-request message, which identifies a network resource (e.g., a port number and/or an IP address) that the service 114 executing on the target 112 is requesting to use. The message may also include a target identifier that identifies the target 112 that transmitted the message, or the message may be received via an interface that is uniquely associated with the target 112. In any event, NRC 204 will know the identity of the target 112 that transmitted the message. The message may also contain information indicating that the target 112 is requesting exclusive use of the network resource. The message may further contain a type identifier identifying the message as being a "listen-request" message.

In response to receiving the listen-request message, NRC 204 processes the message (e.g., parses the message to determine the requested network resource included in the message) and determines whether the requested network resource is available to be used by the requesting target (step 404). In some embodiments, NRC 204 maintains a set of data for each network resource that a service may want to use, and NRC 204 consults this set of data to determine whether the requested network resource is available to be used by the requesting target.

For example, NRC 204 may maintain a set of network resource tables, such as a TCP port table 291 and a UDP port table 292. Port tables 291 and 291 may include a list of port numbers and associate a set of data with each listed port number. An example port table 1000 is illustrated in FIG. 10. As shown in FIG. 10, port table 1000 includes a list 1001 of port numbers. As also shown in FIG. 10, for each listed port number the table stores the following data: (1) a value 1011 identifying the number targets actively using the port number, (2) the value of an outgoing connection variable 1012 (a.k.a., outgoing connection flag 1012) indicating whether or not the port number is actively being used for outgoing connections, (3) the value of an exclusive use variable 1013 (a.k.a., exclusive use flag 1013) indicating whether or not the port number is actively being used exclusively, and (4) a load balancing distribution policy identifier 1014 identifying a load balancing distribution policy. In some embodiments, NRC 204 may maintain a set of TCP port tables 291, wherein each TCP port table 291 is associated with a different IP address. Likewise, NRC 204 may maintain a set of UDP port tables 292, wherein each UDP port table 292 is associated with a different IP address.

Thus, in step 404, if the listen-request message indicates that the requesting target 112 is requesting use of a particular TCP port number and IP address, NRC 204 may consult the TCP port table 291 associated with the requested IP address to determine whether the port number is available. In some embodiments, the port number will be available to the requesting target 112 so long as the TCP port table associated with the IP address indicates that the requested TCP port number is not actively being used for outgoing connections and is not actively being used exclusively by another target. Likewise, if the listen-request message indicates that the requesting target 112 is requesting exclusive use of the TCP port number, the port number will be deemed to be available to the requesting target 112 so long as the requested TCP port number is currently not being used. If the network resource is not available, NRC 204 may transmit a request denied message to the target 112 (step 405), otherwise NRC 204 may transmit to the target a request granted message (step 406).

Next (step 408), if this if the first time any target 112 has requested use of the network resource, NRC 204 may retrieve information identifying a load balancing distribution policy associated with the network resource. As mentioned above, this information may be stored in a port table maintained by NRC 204.

In response to (e.g., in direct response to) determining that that the network resource is available, NRC 204 modifies configuration data used by a load balancer 202 such that the target 112 that transmitted the listen-request message will be included in a certain pool of targets among which the load balancer balances traffic, where the certain pool of targets is associated with the network resource (step 410). For example, in step 410, NRC 204 may add to a target list 212 a target identifier associated with the target 112 that transmitted the listen-request message. NRC 204 may also add to target list 212 the information identifying the load balancing distribution policy, if any, retrieved in step 408.

As a specific example, assume the requested network resource is TCP port number 80 and the target 112 that transmitted the listen-request message is named target123, then in step 410, NRC 204 may select from among a set of target lists the target list 212 that is associated with TCP port number 80 and add to the list "target123." In some embodiments, NRC 204 may directly modify the target list 212. In other embodiments, NRC 204 may indirectly modify the target list 212 by transmitting a message to another entity (e.g., load balancer 202) that causes the other entity to directly modify the target list.

Also in response to determining that that the network resource is available, NRC 204, updates the appropriate network resource table (e.g., TCP port table 291 or UDP port table 292) (step 411). For example, if the listen-request message indicated that the requesting target 112 is requesting exclusive use of a particular TCP port number/IP address tuple, NRC 204 updates the TCP port table 291 associated with the IP address. That is, NRC 204 increments the value identifying the number of users of the TCP port number and sets the exclusive use flag indicating that the TCP port number is being used exclusively.

At some later time, when the target 112 that requested use of the network resource no longer requires use of the network resource, NRC 204 may receive a close message from the target 112 (step 412), which close message may include information identifying the network resource. In response to receiving the close message, NRC 204 modifies configuration data used by the load balancer such that the target 112 that transmitted the close message is removed from the pool of targets that is associated with the network resource (step 414) and updates the appropriate network resource table (e.g., table 291 or 292) (step 416). For example, in step 416, NRC 204 decrements the value identifying the number of users of the network resource. If the target was using the network resource exclusively, then NRC 204 also rests the exclusive use flag to indicate that the network resource is not being used exclusively.

In the manner described above, a load balancer can be automatically configured without the need for periodic monitoring of targets. That is, targets can by dynamically added to a pool of targets and dynamically removed from a pool targets without the need for periodic monitoring. Moreover, NRC 204 has control over whether a target can use a requested network resource.

Figure 5:
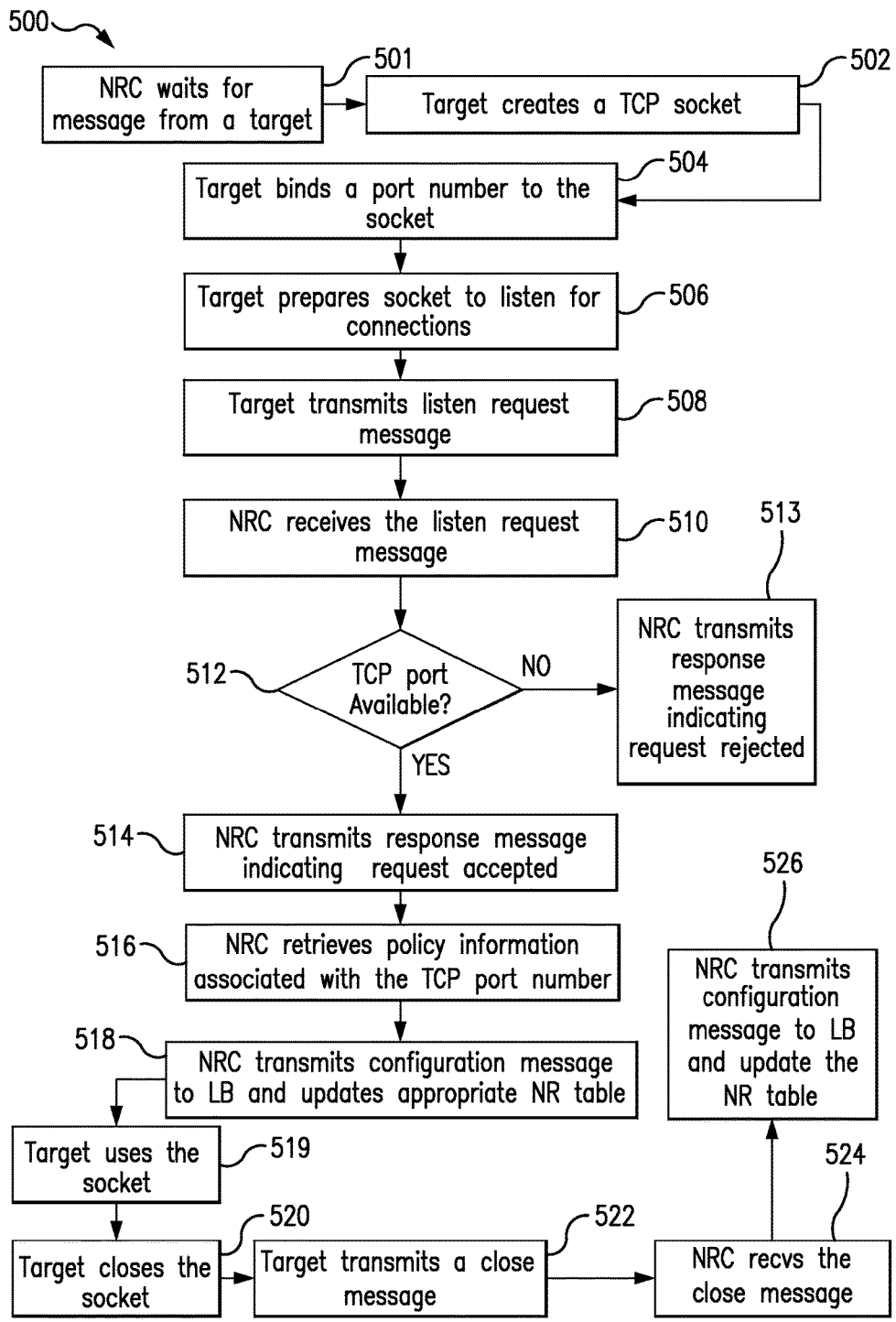

Referring now to FIG. 5, FIG. 5 is a flow chart illustrating a process 500 according to another embodiment. In this embodiment, a target 112 seeks to use a port number for incoming TCP connections. Process 500 may being in step 501, where NRC 204 waits for a message. In step 502, the target 112 creates a TCP socket. For example, in step 502, a service 114 running on target 112 executes the following computer code: sd=socket(AF_INET, SOCK_STREAM, 0). Calling the socket( ) function with these parameters causes the target 112 to create a TCP socket. Next (step 504), target 112 binds a port number to the TCP socket. For example, in step 504, the service 114 running on target 112 executes the following computer code:
server.sin_family=AF_INET;
server.sin_addr.s_addr=INADDR_ANY;
server.sin_port=80;
bind (sd, &server, sizeof(server));
Calling the bind( ) function with these parameters causes the target 112 to bind port number 80 to the TCP socket.

Next (step 506), target 112 prepares socket to listen for incoming connections. For example, in step 506, the service 114 running on target 112 executes the following computer code: listen(sd, 1). Calling the listen( ) function with these parameters causes the target 112 to prepare the socket to listen for incoming connections.

Next (step 508), the target 112 transmits to NRC 204 a listen-request message that includes the port number associated with the socket sd (since socket sd is a TCP socket the port number associated with the socket is referred to as a TCP port number). In some embodiments, target 112 is configured such that target 112 transmits the listen-request message in direct response to the service 114 executing the listen( ) function. For example, in this embodiment, the conventional socket API is modified such that a call to the listen( ) function causes the target 112 to automatically transmit a listen-request message. Accordingly, in such embodiments, a programmer need not make any changes to service 114. In some embodiments, the listen( ) function does not return a value until the target 112 receives from NRC 204 a response to the listen-request message or a time-out occurs.

In step 510, NRC 204 receives the listen-request message. In step 512, NRC 204 processes (e.g., parses) the message to determine the TCP port number included in the message and determines whether the TCP port number included in the message is available. As discussed above, NRC 204 may consult a TCP port table 291 to make this determination. If the port number is not available, NRC 204 may transmit a request denied message to the target 112 (step 513), otherwise NRC 204 may transmit to the target a request granted message (step 514).

In step 516, if this if the first time any target 112 has requested use of the TCP port number, NRC 204 may retrieve information identifying a load balancing distribution policy associated with the port number.

In response to determining that that the network resource (i.e., the TCP port number in this example) is available, NRC 204 modifies configuration data used by a load balancer 202 such that the target 112 that transmitted the listen-request message will be included in a certain pool of targets among which the load balancer balances traffic, where the certain pool of targets is associated with the TCP port number (step 518). In some embodiments, NRC 204 accomplishes this by transmitting to the load balancer a configuration message that includes a target identifier identifying the target 112 that transmitted the listen-request message and the port number (the configuration message may also include a protocol identifier—e.g., TCP—to let the load balancer know that the port number is a TCP port number). In response to this message, the load balancer directly updates the target list associated with the TCP port number by adding to the target list the target identifier, thereby including the target 112 in the pool of targets defined by the target list.

After the target 112 receives the request accepted message from NRC 204, the target 112 uses the socket (e.g., the target 112 waits for incoming TCP connection requests and processes such connection requests upon receipt) (step 519).

At some later point in time when the service 114 running on the target 112 no longer requires use of the socket, the target 112 closes the socket (step 520). For example, in step 520, the service 114 running on target 112 executes the following computer code: close (sd). Calling the close( ) function like this causes the target 112 to close the socket.

Next (step 522), after the close ( ) function is called, the target 112 transmits to NRC 204 a close message that includes the TCP port number. In some embodiments, target 112 is configured such that target 112 transmits the close message in direct response to the service 114 executing the close( ) function. For example, in this embodiment, the conventional socket API is modified such that a call to the close( ) function causes the target 112 to automatically transmit a close message. In other embodiments, target 112 is configured such that target 112 transmits the close message in indirect response to the service 114 executing the close( ) function. For example, in such embodiments, the conventional socket API is modified such that the target 112 automatically transmits the close message only after transmitting a close TCP connection message (e.g., a TCP FIN message) to the other party to the TCP connection, which is transmitted by target 112 in response to the service executing the close( ) command, and only after waiting a predetermined amount of time after the target 112 receives an acknowledgement to the close connection message (e.g., a TCP FIN-ACK message) transmitted from the other party to the TCP connection (in some embodiments this predetermined amount of time may be about 4 minutes).

In step 524, NRC 204 receives the close message from the target 112. In response to receiving the close message, NRC 204 processes the close message (e.g., parses the message to determine the TCP port number included therein) and modifies configuration data used by the load balancer such that the target 112 that transmitted the close message is removed from the pool of targets that is associated with the TCP port number and updates the appropriate TCP port table (step 526) (e.g., decrements the value identifying the number of users of the TCP port number).

Figure 6:
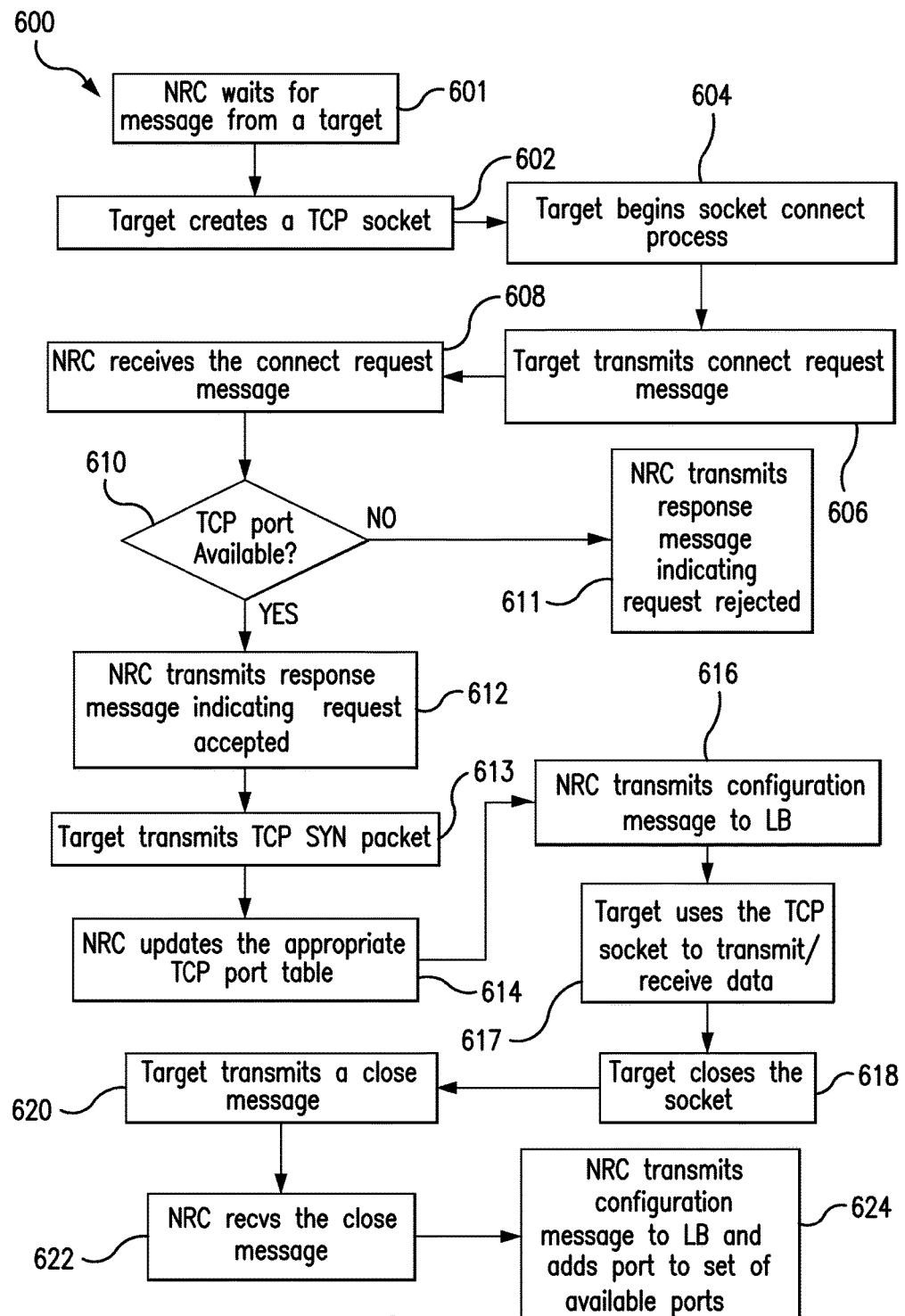

Referring now to FIG. 6, FIG. 6 is a flow chart illustrating a process 600 according to another embodiment. In this embodiment, a target 112 seeks to use a TCP port number for outgoing connections. Process 600 may being in step 601, where NRC 204 waits for a message. In step 602, the target 112 creates a TCP socket. Next (step 604), target 112 begins a process to connect the TCP socket to a remote socket (e.g., a socket created by client 102). For example, in step 604, the service 114 running on target 112 executes the following computer code: connect(sd, &SockAddr, sizeSockAddr). Calling the connect( ) function with these parameters causes the target 112 to begin the process of connecting the socket (sd) to the remote socket identified by the structure SockAddr.

Next (step 606), the target 112 transmits to NRC 204 a "TCP connect-request" message (i.e., a message indicating that the target is configured to initiate a TCP connection with another device). In some embodiments, target 112 is configured such that target 112 transmits the TCP connect-request message in direct response to the service 114 executing the connect( ) function. For example, in this embodiment, the conventional socket API is modified such that a call to the connect( ) function causes the target 112 to automatically transmit a TCP connect-request message. Accordingly, in such embodiments, a programmer need not make any changes to service 114. In some embodiments, the connect( ) function does not return a value until after the target 112 receives from NRC 204 a response to the TCP connect-request message or a time-out occurs.

Next (step 608), NRC 204 receives the TCP connect-request message. In some embodiments, the TCP connect-request message may include (i) a type identifier identifying the message as being a "TCP connect-request" message and (ii) an IP address. The message may also include the address of the remote socket (e.g., the TCP port number and IP address identified in the SockAddr structure). The message may also include a target identifier that identifies the target 112 that transmitted the TCP connect-request message or the TCP connect-request message may be received via an interface that is uniquely associated with the target 112. In any event, NRC 204 will know the identity of the target 112 that transmitted the TCP connect-request message.

In step 610, NRC 204 processes the TCP connect-request message and determines whether a TCP port is available for use with the connection. For example, in some embodiments, NRC 204, in response to receiving the TCP connect-request message, examines the TCP port table 291 associated with the IP address identified in the message to determine whether there are any unused port numbers. If no unused TCP port numbers exist, then NRC 204 transmits a request denied message to the target 112 (step 611). If one or more unused TCP port numbers exist, then NRC 204 selects an unused port number from the set of unused port number and transmits to the target a request granted message that includes the selected unused port number (step 612). In response to receiving the request granted message, the target 112 may transmit a TCP SYN packet to the remote socket (step 613).

In step 614, NRC 204 updates the appropriate TCP port table 291 (e.g., the TCP port table associated with the IP address included in the TCP connect-request message). For example, in step 614, NRC 204 sets the outgoing connection flag associated with the selected TCP port number to the value of TRUE.

In step 616, NRC 204 transmits to the load balancer 202 a configuration message that includes a target identifier identifying the target 112 that transmitted the TCP connect-request message. The configuration message further includes the following five tuple: (i) the port number of the remote socket, (ii) the IP address of the remote socket, (iii) the port number of the local socket (i.e., the selected TCP port number), (iv) the IP address of the local socket (i.e., the IP address included in the TCP connect-request message), and (v) a protocol identifier (e.g., TCP or UDP). In response to this message, the load balancer directly updates its connection table 211 to map the target identifier with the following five tuple: protocol identifier, remote IP addr, remote port number, local IP addr, local port number. In this way, whenever the load balancer 202 receives from network 110 a packet that matches the five tuple, the load balancer will know that that packet should be forwarded to the target 112 identified by the target identifier mapped with five tuple. In some embodiments, step 616 is not performed because, in some embodiments, all traffic must flow through the load balancer and it may be configured to update its connection table 211 automatically in response to receiving from a target 112 a TCP SYN packet, which packet will include the five tuple: protocol identifier, IP address/port number of remote socket, and IP address/port number of local socket, and which packet will be uniquely associated with a particular target. However, if step 616 is performed, then all traffic need not flow through the load balancer and DSR may be used.

In step 617, the target 112 uses the TCP socket to transmit/receive data. At some later point in time, the target 112 closes the socket (step 618) and transmits to NRC 204 a close message (step 620). In step 622, NRC 204 receives the close message from the target 112. In response to receiving the close message, NRC 204 may modify the connection table to remove the entry that mapped the TCP connection with the target and updates the appropriate TCP port table (step 526) (e.g., resets the outgoing connection flag associated with the selected TCP port number to FALSE and decrements the value identifying the number of users of the).

Figure 7:
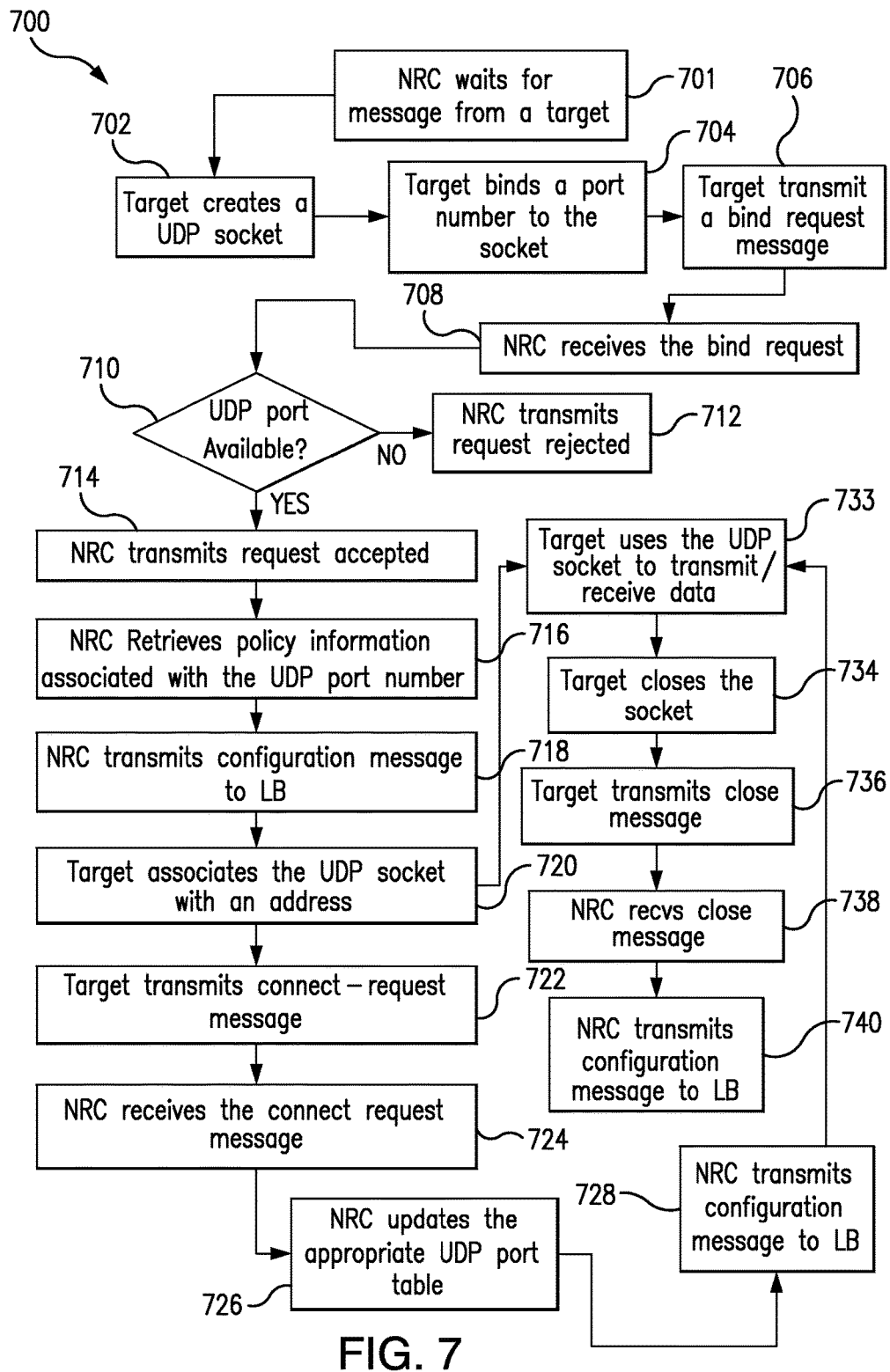

Referring now to FIG. 7, FIG. 7 is a flow chart illustrating a process 700 according to another embodiment. In this embodiment, a target 112 seeks to use a UDP port number for incoming or outgoing sessions. Process 700 may being in step 701, where NRC 204 waits for a message. In step 702, the target 112 creates a UDP socket. For example, in step 702, a service 114 running on target 112 executes the following computer code: sd=socket(AF_INET, SOCK_DGRAM, 0). Calling the socket( ) function with these parameters causes the target 112 to create a UDP socket. Next (step 704), target 112 binds a port number to the socket. For example, in step 704, the service 114 running on target 112 executes the following computer code: bind(sd, &Addr, sizeof(server)). Calling the bind( ) function with these parameters causes the target 112 to bind to the UDP socket the port number identified in the Addr structure.

Next (step 706), the target 112 transmits to NRC 204 a "hind-request" message (i.e., a message indicating that a service 114 running on the target 112 is configured to bind a port number to a UDP socket). In some embodiments, the bind-request message includes the port number and IP address that the service 114 executing on the target 112 is requesting to use. The message may also include a target identifier that identifies the target 112 that transmitted the message, or the message may be received via an interface that is uniquely associated with the target 112. In any event, NRC 204 will know the identity of the target 112 that transmitted the bind-request message. The message may also contain information indicating that the target 112 is requesting exclusive use of the network resource (e.g., port number) identified in the bind-request message. The bind-request message may further contain a type identifier identifying the message as being a "bind-request" message.

In some embodiments, target 112 is configured such that target 112 transmits the bind-request message in direct response to the service 114 executing the bind( ) function. For example, in this embodiment, the conventional socket API is modified such that a call to bind an address to a UDP socket causes the target 112 to automatically transmit the bind-request message. In some embodiments, the bind( ) function does not return a value until the target 112 receives from NRC 204 a response to the bind-request message or a time-out occurs.

In step 708, NRC 204 receives the bind-request message. In step 710, NRC 204 processes the bind-request message (e.g., determines the port number identified in the bind-request message) and determines whether the port number identified in the bind-request message is available. As discussed above, NRC 204 may consult a UDP port table 291 to make this determination. If the port number is not available, NRC 204 may transmit a request denied message to the target 112 (step 712), otherwise NRC 204 may transmit to the target a request granted message (step 714).

In step 716, if this if the first time any target 112 has requested use of the UDP port number, NRC 204 may retrieve information identifying a load balancing distribution policy associated with the UDP port number.

In step 718, in response to determining that that the port number is available, NRC 204 modifies configuration data used by load balancer 202 such that the target 112 that transmitted the bind-request message will be included in a certain pool of targets among which the load balancer balances traffic, where the certain pool of targets is associated with the UDP port number. In some embodiments, NRC 204 accomplishes this by transmitting to the load balancer a configuration message that includes a target identifier identifying the target 112 that transmitted the bind-request message and the UDP port number. In response to this message, the load balancer directly updates the target list associated with the UDP port number by adding to the target list the target identifier, thereby including the target 112 in the pool of targets defined by the target list.

In step 719, NRC 204 updates the appropriate UDP port table 292 (e.g., the UDP port table associated with the IP address included in the bind-request message). For example, in step 719, NRC 204 increments the value identifying the number of users of the UDP port number.

After step 719, process 700 may proceed to step 720 or step 733.

In step 720, target 112 associates the UDP socket with a remote address. For example, in step 604, the service 114 running on target 112 executes the following computer code: connect(sd, &SockAddr, sizeSockAddr). Calling the connect( ) function with these parameters causes the target 112 to associated the UDP socket identified by the socket descriptor sd with the address identified by the information contained in the SockAddr structure.

Next (step 722), the target 112 transmits to NRC 204 a "UDP connect-request" message (i.e., a message indicating that the target has associated the UDP socket with a remote address). In some embodiments, target 112 is configured such that target 112 transmits the UDP connect-request message in direct response to the service 114 executing the connect( ) function. For example, in this embodiment, the conventional socket API is modified such that a call to the connect( ) function causes the target 112 to automatically transmit a UDP connect-request message. In some embodiments, the connect( ) function does not return a value until after the target 112 receives from NRC 204 a response to the UDP connect-request message or a time-out occurs.

Next (step 724), NRC 204 receives the UDP connect-request message. In some embodiments, the UDP connect-request message may include (i) a type identifier identifying the message as being a "UDP connect-request" message, (ii) the UDP port number that was included in the bind-request message, and (iii) an IP address. The message may also include the address of a remote socket (e.g., the UDP port number and IP address identified in the SockAddr structure). The message may also include a target identifier that identifies the target 112 that transmitted the UDP connect-request message or the UDP connect-request message may be received via an interface that is uniquely associated with the target 112. In any event, NRC 204 will know the identity of the target 112 that transmitted the UDP connect-request message.

In step 726, NRC 204 processes the connect-request message (e.g., determines the IP address included in the UDP connect-request message) and updates the appropriate UDP port table 292 (e.g., the UDP port table associated with the IP address included in the UDP connect-request message). For example, in step 726, NRC 204 sets the outgoing connection flag associated with the selected UDP port number to the value of TRUE.

In step 728, NRC 204 transmits to the load balancer 202 a configuration message that includes a target identifier identifying the target 112 that transmitted the UDP connect-request message. The configuration message further includes the following five tuple: (i) the port number of the remote socket, (ii) the IP address of the remote socket, (iii) the port number of the local socket (i.e., the UDP port number from the bind-request message), (iv) the IP address of the local socket, and (v) a protocol identifier (e.g., UDP).

In response to this message, the load balancer directly updates its connection table 211 to map the target identifier with the following five tuple: protocol identifier, remote IP addr, remote port number, local IP addr, local port number. In this way, whenever the load balancer 202 receives from network 110 a packet that matches the five tuple, the load balancer will know that that packet should be forwarded to the target 112 identified by the target identifier mapped with five tuple. In addition, in response to the configuration message, the load balancer will remove the identified target from the pool of targets associated with the UDP port number.

In step 733, the target 112 uses the UDP socket to transmit/receive data. At some later point in time, the target 112 closes the socket (step 734) and transmits to NRC 204 a close message (step 736) that includes the UDP port number. In step 738, NRC 204 receives the close message from the target 112. In response to receiving the close message, NRC 204 may modify the connection table to remove the entry that mapped the UDP connection with the target and updates the appropriate UDP port table (step 740) (e.g., resets the outgoing connection flag associated with the selected UDP port number to FALSE and decrements the value identifying the number of users of the UDP port number).

Figure 8:
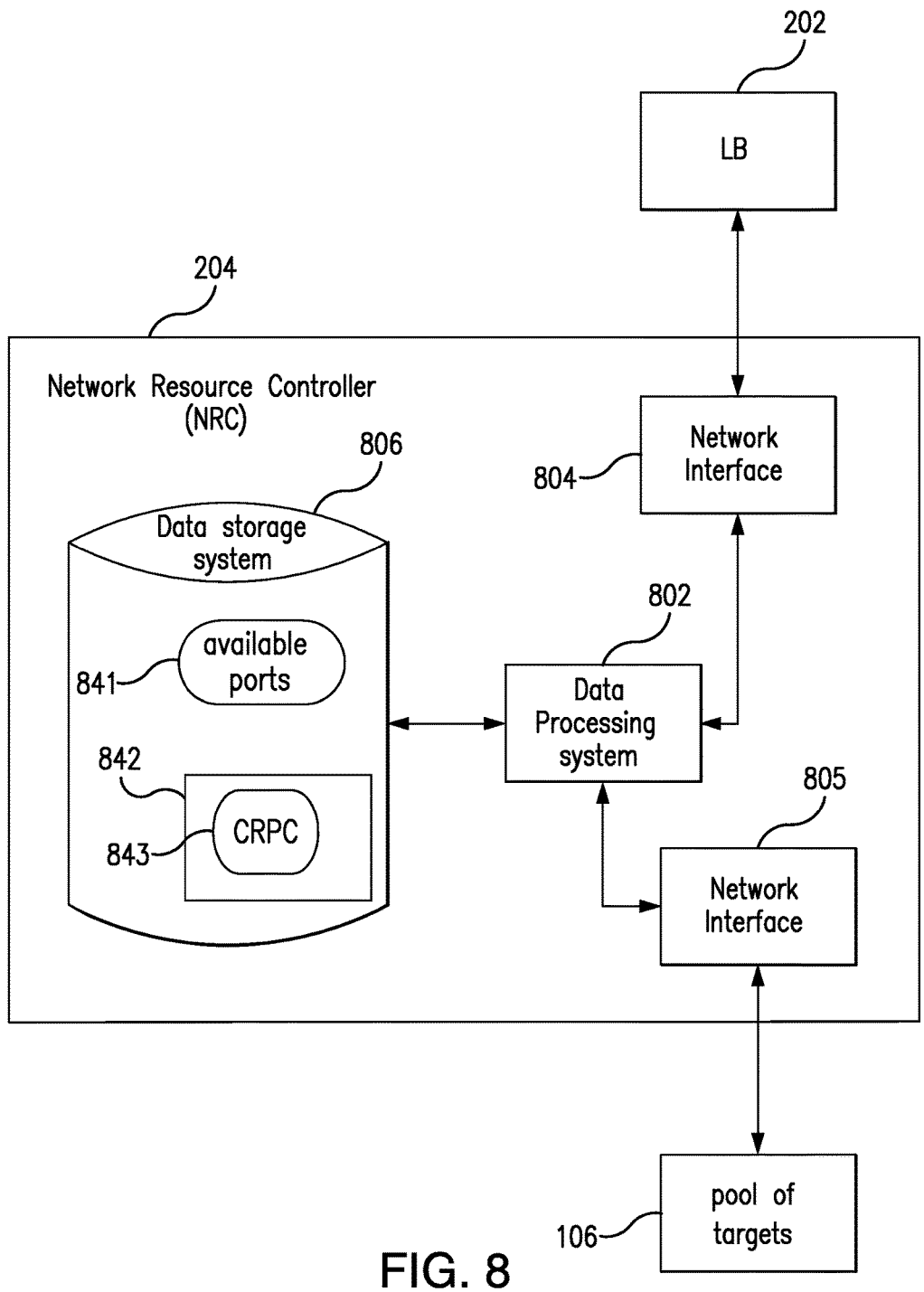
FIG. 8 is a block diagram of a particular embodiment of a network resource controller.

Referring now to FIG. 8, FIG. 8 illustrates a block diagram of NRC 204 according to some embodiments of the invention. As shown in FIG. 8, NRC 204 may include: a data processing system 802, which may include one or more microprocessors and/or one or more circuits, such as an application specific integrated circuit (ASIC), Field-programmable gate arrays (FPGAs), etc; a network interface 804; data storage system 806, which may include one or more non-volatile storage devices and/or one or more volatile storage devices (e.g., random access memory (RAM)). As shown, data storage system 806 may be used to store port information (e.g., port tables 291 and 292). In embodiments where data processing system 802 includes a microprocessor, computer readable program code 843 may be stored in a computer readable medium 842, such as, but not limited, to magnetic media (e.g., a hard disk), optical media (e.g., a DVD), memory devices (e.g., random access memory), etc. In some embodiments, computer readable program code 843 is configured such that when executed by a processor, code 843 causes NRC 204 to perform steps described above (e.g., steps describe above with reference to the flow charts shown in FIGS. 4-7). In other embodiments, NRC 204 is configured to perform steps described above without the need for code 843. That is, for example, data processing system 802 may consist merely of one or more ASICs. Hence, the features of the present invention described above may be implemented in hardware and/or software. For example, in particular embodiments, the functional components of NRC 204 described above may be implemented by data processing system 802 executing computer instructions 843, by data processing system 802 operating independent of any computer instructions 843, or by any suitable combination of hardware and/or software.

Figure 9:
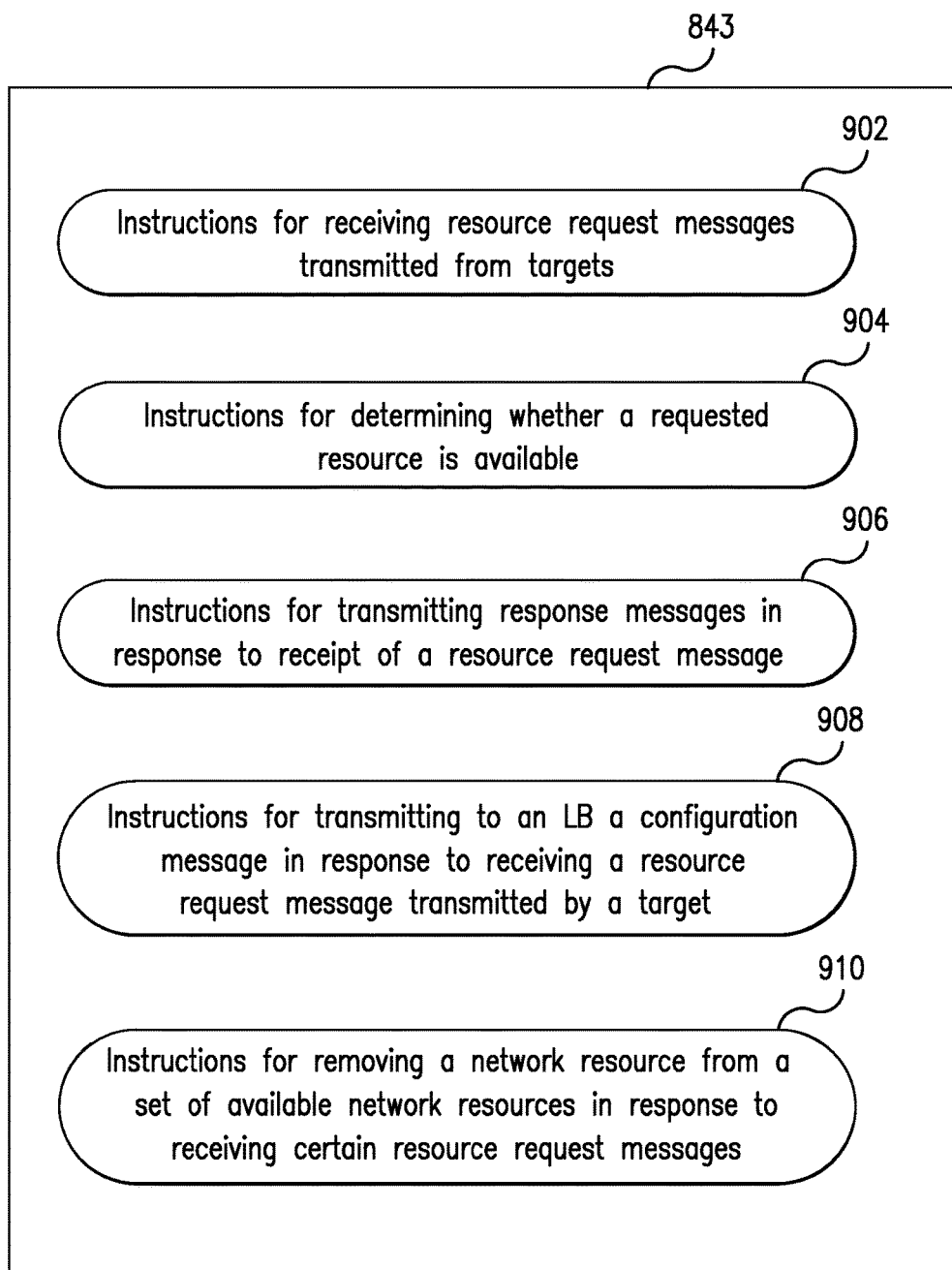
FIG. 9 is a block diagram illustrating example software components of a network resource controller.

Referring now to FIG. 9, FIG. 9 illustrates an embodiment of computer readable program code (CRPC) 843. In the embodiment shown, CRPC 843 includes: (1) a set of instructions 902 for receiving resource request messages transmitted from targets, (2) a set of instructions 904 for processing resource request message to determine a requested network resource and for determining whether the requested network resource is available, (3) a set of instructions 906 for transmitting response messages in response to receipt of a resource request message, (4) a set of instructions 908 for transmitting to a load balancer a configuration message in response to receiving a resource request message transmitted by a target, and (5) a set of instructions 910 for removing a network resource from a set of available network resources in response to receiving certain resource request messages.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for updating configuration data used by a load balancer to balance traffic among targets included in a pool of targets, the method comprising:
receiving, from a first target, a resource request message requesting use of a network resource, wherein the resource request message includes information identifying the network resource that a particular type of service executing on the first target is requesting to use, a target identifier associated with the first target, and a type identifier for identifying a type of the resource request message based on the particular type of service executing on the first target;
determining whether the network resource is available to be used by the first target;
in response to the determination, selecting, from among a set of target lists, a target list associated with the network resource, wherein each target list in the set of target lists is associated with a corresponding network resource; and
updating the configuration data, wherein:
the configuration data comprises the set of target lists that provides information identifying the targets that are included in the pool of targets, and
the step of updating the configuration data comprises adding the target identifier associated with the first target to the selected target list such that the first target is included in the pool of targets.

2. The method of claim 1, wherein the network resource is a port number.

3. The method of claim 2, wherein the port number is a Transmission Control Protocol (TCP) port number, and wherein the resource request message indicates that the particular type of service executing on the first target is configured to listen on a socket to which the TCP port number is bound.

4. The method of claim 3, wherein the resource request message indicates that the particular type of service executing on the first target has called a socket listen function provided by a socket application programming interface (API) and has passed, to the socket listen function, an identifier identifying a socket to which the TCP port number is bound.

5. The method of claim 2, further comprising:
transmitting, to the first target, a response message indicating that the port number is available to be used by the first target, wherein the step of transmitting occurs in direct response to determining that the port number is available to be used by the first target.

6. The method of claim 1, further comprising:
receiving, from a second target, a TCP connect-request message indicating that the second target initiates a TCP connection;
in response to receiving the TCP connect-request message, selecting an available port number for use with the TCP connection; and
after selecting the available port number, transmitting, to the second target, a response message containing the selected available port number.

7. The method of claim 6, further comprising setting an outgoing connection flag associated with the selected available port number to a predetermined value as a result of selecting the available port number.

8. The method of claim 1, further comprising:
receiving, from a second target, a bind-request message indicating that the second target binds an address to a UDP socket; and
updating the configuration data in response to receiving the bind-request message, wherein:
the configuration data further comprises information defining another pool of targets, and
the step of updating the configuration data comprises modifying the information defining the other pool of targets such that the second target is included in the other pool of targets.

9. The method of claim 8, further comprising:
in response to receiving the bind-request message, receiving, from the second target, a connect-request message indicating that the second target associates a remote address with the UDP socket; and
updating the configuration data in response to receiving the connect-request message, wherein
the step of updating the configuration data comprises modifying the information defining the other pool of targets such that the second target is no longer included in the other pool of targets.

10. The method of claim 1, wherein the method is performed by a network resource controller (NRC), wherein the step of updating the configuration data comprises sending, from the NRC to the load balancer, a configuration message comprising a first identifier identifying the network resource and a second identifier uniquely associated with the first target, and wherein the load balancer updates the configuration data in response to receiving the configuration message.

11. The method of claim 1, further comprising:
receiving, from a second target, a second resource request message requesting use of the network resource, wherein the second resource request message includes information identifying the network resource and a target identifier associated with the second target;
determining whether the network resource is available to be used by the second target;
in response to the determination, selecting, from among the set of target lists, the target list that is associated with the network resource; and
updating the configuration data, wherein
the step of updating the configuration data comprises adding, to the selected target list, the target identifier associated with the second target such that the second target is included in the pool of targets, wherein
the network resource comprises a port number and an IP address, and wherein the step of updating the configuration data is performed during a period of time while the second target is using the network resource.

12. The method of claim 1, further comprising:
receiving, from the first target, a close message indicating that the first target no longer requires the network resource; and
in response to receiving the close message, updating the configuration data such that the first target is removed from the pool of targets.

13. A network resource controller for updating configuration data used by a load balancer to balance traffic among targets included in a pool of targets, wherein the configuration data comprises a set of target lists that provides information identifying the targets that are included in the pool of targets, the network resource controller comprising:
a network interface operable to receive a resource request message transmitted from a target, wherein the resource request message includes information identifying a network resource that a particular type of service executing on the target is requesting to use, a target identifier associated with the target, and a type identifier for identifying a type of the resource request message based on the particular type of service executing on the target; and
a processor coupled to the network interface, the processor being configured to:
determine whether the network resource identified in the resource request message is available to be used by the target in response to the network interface receiving the resource request message;
in response to the determination, select, from among the set of target lists, a target list associated with the network resource, wherein each target list in the set of target lists is associated with a corresponding network resource; and
update the configuration data, wherein the set of target lists further provides information indicating that the pool of targets includes the target that transmitted the resource request message, and wherein the processor is configured to update the configuration data by adding the target identifier associated with the target to the selected target list.

14. The network resource controller of claim 13, wherein the network resource comprises a port number and the processor determines whether the network resource is available to be used by the target by determining whether the port number is available.

15. The network resource controller of claim 14, wherein the processor is configured to determine whether the port number is available by determining whether an exclusive use flag associated with the port number is set to a certain value and/or determining whether an outgoing connection flag associated with the port number is set to a certain value.

16. The network resource controller of claim 14, wherein the processor is further configured to use the network interface to transmit, to the target, a response message indicating that the port number is available to be used by the target, and wherein the transmission of the response message, by the processor, occurs in direct response to the processor determining that the port number is available to be used by the target.

17. The network resource controller of claim 13, wherein the processor, in response to processing a close message transmitted from the target, indicating that the target no longer requires the network resource, is further configured to update the configuration data such that the pool of targets no longer includes the target, wherein the processor is further configured to update the configuration data by sending a configuration message to the load balancer, which is configured to update the configuration data in direct response to receiving the configuration message.

18. A computer program product for updating configuration data used by a load balancer to balance traffic among a pool of targets, the computer program product comprising a non-transitory computer readable medium storing computer readable program code, the computer readable program code comprising:
a set of instructions for receiving a resource request message transmitted from a target, the resource request message requesting use of a network resource, wherein the resource request message includes information identifying the network resource that a particular type of service executing on the target is requesting to use, a target identifier associated with the target, and a type identifier for identifying a type of the resource request message based on the particular type of service executing on the target;
a set of instructions for determining whether the requested network resource is available to be used by the target;
a set of instructions for selecting, from among a set of target lists, a target list associated with the network resource, wherein each target list in the set of target lists is associated with a corresponding network resource in response to the determination that the network resource is available; and
a set of instructions for updating the configuration data, wherein the configuration data includes the set of target lists that provides information indicating that the pool of targets includes the target that transmitted the resource request message, and wherein the set of instructions for updating the configuration data comprises instructions for adding the target identifier associated with the target to the selected target list.

19. The computer program product of claim 18, wherein the resource request message is transmitted by the target in response to the particular type of service, executing on the target, calling a listen function that is included in a library of socket functions.

20. The computer program product of claim 18, further comprising:
a set of instructions for receiving, from the target, a close message indicating that the target no longer requires the network resource; and
a set of instructions for sending, to the load balancer, a second configuration message in response to the close message, wherein the second configuration message causes the load balancer to remove, from the selected target list, the target identifier associated with the target, thereby removing the target from the pool of targets.

* * * * *